(12) United States Patent　　(10) Patent No.: US 10,779,231 B2
Chen　　(45) Date of Patent: Sep. 15, 2020

(54) CELL DETERMINING METHOD, TERMINAL DEVICE, AND NETWORK DEVICE

(71) Applicant: HUAWEI TECHNOLOGIES CO., LTD., Shenzhen, Guangdong (CN)

(72) Inventor: Qucai Chen, Shanghai (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/411,838

(22) Filed: May 14, 2019

(65) Prior Publication Data

US 2019/0268840 A1　Aug. 29, 2019

Related U.S. Application Data

(63) Continuation of application No. PCT/CN2016/105845, filed on Nov. 15, 2016.

(51) Int. Cl.
*H04W 84/04*　(2009.01)
*H04W 48/20*　(2009.01)
(Continued)

(52) U.S. Cl.
CPC ........... *H04W 48/20* (2013.01); *H04W 28/24* (2013.01); *H04W 36/00* (2013.01); *H04W 48/00* (2013.01);
(Continued)

(58) Field of Classification Search
CPC ..... H04W 48/20; H04W 48/18; H04W 28/24; H04W 72/10; H04W 48/16; H04W 48/14; H04W 84/042
See application file for complete search history.

(56) References Cited

U.S. PATENT DOCUMENTS

2010/0188996 A1*　7/2010　Ruelle .................. H04W 48/18
　　　　　　　　　　　　　　　　　　　　　　　370/252
2011/0305192 A1*　12/2011　Faccin .................. H04W 48/18
　　　　　　　　　　　　　　　　　　　　　　　370/328
(Continued)

FOREIGN PATENT DOCUMENTS

CN　　　1968535 A　　5/2007
CN　　101052216 A　　10/2007
(Continued)

OTHER PUBLICATIONS

Huawei:"Support of Network Slice Discovery",3GPP Draft; R3-162462, XP051152110, 4 pages.
(Continued)

*Primary Examiner* — Joseph E Dean, Jr.
(74) *Attorney, Agent, or Firm* — Womble Bond Dickinson (US) LLP

(57) ABSTRACT

This application provides a cell determining method, a terminal device, and a network device. The method includes: obtaining, by a terminal device, service capability information of at least one cell, where the service capability information includes slice information and/or service information; and determining, by the terminal device based on the service capability information and a service requirement of the terminal device, a first cell in the at least one cell as a cell to be camped on, where the first cell is a cell, in the at least one cell, that supports at least one service of the terminal device. According to the cell determining method, the terminal device, and the network device in this application, the terminal device can camp on a suitable cell.

12 Claims, 6 Drawing Sheets

(51) Int. Cl.
    H04W 28/24    (2009.01)
    H04W 48/14    (2009.01)
    H04W 48/16    (2009.01)
    H04W 48/18    (2009.01)
    H04W 72/10    (2009.01)
    H04W 48/00    (2009.01)
    H04W 36/00    (2009.01)

(52) U.S. Cl.
    CPC ........... *H04W 48/14* (2013.01); *H04W 48/16* (2013.01); *H04W 48/18* (2013.01); *H04W 72/10* (2013.01); *H04W 84/042* (2013.01)

(56) References Cited

U.S. PATENT DOCUMENTS

| 2015/0289221 | A1* | 10/2015 | Nayak | H04W 60/005 455/435.1 |
| 2017/0070892 | A1* | 3/2017 | Song | H04L 41/042 |
| 2017/0367036 | A1 | 12/2017 | Chen et al. | |

FOREIGN PATENT DOCUMENTS

| CN | 105704765 A | 6/2016 |
| CN | 105813133 A | 7/2016 |
| CN | 109891832 A | 6/2019 |
| WO | 2015167897 A1 | 11/2015 |
| WO | 2017218849 A1 | 12/2017 |

OTHER PUBLICATIONS

Apple:"A solution of network slice instance selection and association", 3GPP Draft; S2-165458_E-MAIL REV4_S2-165408, XP051169438, 6 pages.
3GPP TSG-RAN WG2 Meeting #95, R2-165277,:"RAN Design Issues for Supporting Slicing",Göteborg, Sweden, Aug. 22-26, 2016, total 5 pages.
SA WG2 Meeting #116BIS,S2-165458,:"A solution of network slice instance selection and association",Aug. 29-Sep. 2, 2016, Sanya, P.R. China,total 6 pages.
3GPP TSG-RAN WG3 Meeting #93bis,R3-162462:"Support of Network Slice Discovery",Sophia Antipolis, France, Oct. 10-14, 2016,total 4 pages.
3GPP TSG-RAN WG2 Meeting #96,R2-167648,:"Impact of slicing on System Information",Reno, USA, Nov. 14-18, 2016,total 4 pages.
3GPP TR 38.801 V0.6.0:"3rd Generation Partnership Project;Technical Specification Group Radio Access Network; Study on New Radio Access Technology;Radio Access Architecture and Interfaces(Release 14)",Oct. 2016,total 55 pages.

* cited by examiner

CELL DETERMINING METHOD, TERMINAL DEVICE, AND NETWORK DEVICE

CROSS-REFERENCE TO RELATED APPLICATIONS

This application is a continuation of International Application No. PCT/CN2016/105845, filed on Nov. 15, 2016, the disclosure of which is hereby incorporated by reference in its entirety.

TECHNICAL FIELD

This application relates to the communications field, and more specifically, to a cell determining method, a terminal device, and a network device.

BACKGROUND

With development of communications technologies and various applications, a terminal device has more service requirements, and each service type has a higher requirement on quality of service (QoS). There are more QoS types of the service type, and service requirements have great differences. Consequently, it is difficult for an original single network service to simultaneously meet such numerous service requirements with great differences. Currently, common implementation technologies include: (1) a plurality of types of QoS services share one network (which is applied to a scenario in which high isolation between different QoS services is not required); and (2) a network is established for only some services. The foregoing two manners may be implemented by introducing a network slice.

For a radio access network, there are many manners for implementing multi-slice, including: Manner 1: different slices share one network (specifically, the different slices are corresponding to a same cell, and different service types are implemented by using different channels or different QoS services); and Manner 2: each slice is corresponding to an independent network (specifically, the different slices are respectively corresponding to different cells). However, after the network slice is introduced, the terminal device cannot camp on a suitable cell when selecting a cell for camping, and as a result, a required service cannot be obtained. Therefore, it is an urgent need to put forward a method to resolve the problem.

SUMMARY

Embodiments of the present disclosure provide a cell determining method, a terminal device, and a network device, so that the terminal device can camp on a suitable cell.

According to a first aspect, a cell determining method is provided, including:

obtaining, by a terminal device, service capability information of at least one cell, where the service capability information includes slice information and/or service information; and determining, by the terminal device based on the service capability information and a service requirement of the terminal device, a first cell in the at least one cell as a cell to be camped on, where the first cell is a cell, in the at least one cell, that supports at least one service of the terminal device.

According to the cell determining method in this embodiment of the present disclosure, the terminal device obtains the service capability information of the at least one cell, and determines, based on the service capability information and the service requirement of the terminal device, the first cell in the at least one cell as the cell to be camped on, where the first cell is the cell, in the at least one cell, that supports the at least one service of the terminal device, so that the terminal device can camp on a suitable cell.

In some possible implementations, the service capability information may be described from a plurality of dimensions (for example, a vertical industry dimension or a service feature dimension). For example, the service capability information may include at least one of the following information.

a. Network Slice Information

In one embodiment, the network slice information may include a slice type and/or a slice identity (ID). The network slice information may be described from a perspective of a service field, including an Internet of Vehicles field, a smart metering field, and the like.

The network slice may be referred to as a slice for short, and is an End-to-End (E2E) network provided by an operator for a type of service with a specific QoS requirement. In other words, each service type is corresponding to a dedicated slice. Slices are isolated from each other and do not affect each other logically.

b. Service Information

In one embodiment, the service information may include a service type and/or a service identity (ID). The service information may be described from a perspective of a QoS dimension, including a broadband service, a short latency service, a big connection service, and a very important person (VIP) service, and the like.

c. Other Information that can Represent a Cell Service Capability, or Other Information that can Describe a Service Supported by a Cell In one embodiment, the foregoing service capability information (a to c) that is used to represent the cell service capability may be used in combination. This is not limited herein.

In one embodiment, the terminal device may receive the service capability information sent by a network device by using a broadcast message.

In some possible implementations, before the determining a first cell in the at least one cell as a cell to be camped on, the method may further include:

obtaining, by the terminal device, a public land mobile network (PLMN) priority of the at least one cell, where the first cell has a highest PLMN priority in the at least one cell.

In some possible implementations, the determining a first cell in the at least one cell as a cell to be camped on includes:

when the at least one cell has a same PLMN priority, selecting, by the terminal device, the first cell for camping, where the first cell has a highest slice matching degree in the at least one cell, and the slice matching degree represents a matching degree between a service capability supported by a cell and the service requirement of the terminal device. For example, the slice matching degree is used to represent a ratio of a quantity of services of the terminal device supported by the cell to a total quantity of services of the terminal device. For another example, the slice matching degree is used to represent a quantity of services of the terminal device supported by the cell.

In other words, for cells that have a same PLMN priority, the terminal device may select a cell that has a highest slice matching degree for camping.

Therefore, during cell selection, the terminal device may preferentially consider a PLMN priority of a cell.

In some possible implementations, before the determining a first cell in the at least one cell as a cell to be camped on, the method may further include:

obtaining, by the terminal device, a slice matching degree of the at least one cell, where the slice matching degree represents a matching degree between a service capability supported by a cell and the service requirement of the terminal device, and the first cell has a highest slice matching degree in the at least one cell.

In some possible implementations, the determining a first cell in the at least one cell as a cell to be camped on includes:

when the at least one cell has a same slice matching degree, selecting, by the terminal device, the first cell for camping, where the first cell has a highest public land mobile network (PLMN) priority in the at least one cell.

In other words, for cells that have the same slice matching degree, the terminal device may select a cell that has a highest PLMN priority for camping.

Therefore, during cell selection, the terminal device may preferentially consider a slice matching degree of a cell.

In some possible implementations, the terminal device may further consider the PLMN priority of the cell and the slice matching degree of the cell in a compromise manner. For example, if there are some slices that need to be forcibly matched, the terminal device may select a cell in descending order of importance of "a forcibly-matched slice, a PLMN priority, and a matching degree of another slice".

In some possible implementations, the method further includes:

obtaining, by the terminal device, a signal measurement value of the at least one cell; and reselecting, by the terminal device, a cell based on the signal measurement value of the at least one cell, the service capability information, and the service requirement of the terminal device.

Herein, the terminal device may obtain the signal measurement value of the at least one cell, and reselects a cell based on the signal measurement value of the at least one cell, the service capability information, and the service requirement of the terminal device.

In this embodiment of the present disclosure, the signal measurement value may include a signal receiving level value or a signal receiving quality value. A measurement signal targeted by the signal measurement value may be a pilot signal of the cell, or may be a synchronization signal of the cell (for example, a primary synchronization signal and/or a secondary synchronization signal), or another cell signal. This is not limited herein.

In some possible implementations, the reselecting, by the terminal device, a cell based on the signal measurement value of the at least one cell, the service capability information, and the service requirement of the terminal device includes:

when a signal measurement value of each of the at least one cell is higher than a first threshold, and the first cell supports a maximum quantity of services of the terminal device, selecting, by the terminal device, the first cell as the reselected cell.

Herein, during cell reselection, if a signal measurement value of each of the at least one cell meets a threshold, the terminal device may select a cell that supports a maximum quantity of services of the terminal device as the reselected cell.

In some possible implementations, the reselecting, by the terminal device, a cell based on the signal measurement value of the at least one cell, the service capability information, and the service requirement of the terminal device includes:

when a quantity of services of the terminal device supported by each of the at least one cell is greater than a second threshold, and the first cell has a maximum signal measurement value in the at least one cell, selecting, by the terminal device, the first cell as the reselected cell.

Herein, during cell reselection, if a quantity of services supported by each of the at least one cell meets a threshold, the terminal device may select a cell with a maximum signal measurement value as the reselected cell.

It should be understood that the terminal device may specifically select, based on a predefined configuration parameter (for example, a configuration parameter defined in a protocol or configured by the network device), a manner to reselect a cell. For example, it is predefined that "a priority of a cell signal measurement value" is higher than "a priority of a quantity of services supported by a cell".

In some possible implementations, the method further includes:

when the first cell does not support all services of the terminal device, reselecting, by the terminal device, a cell according to a preset moment, and selecting a second cell as a reselected cell, where a quantity of services of the terminal device supported by the second cell is greater than a quantity of services of the terminal device supported by the first cell.

In one embodiment, the terminal device may set a timer, and when the cell does not support all the services of the terminal device or the quantity of supported services does not meet a threshold, the terminal device may trigger the timer to reselect a cell.

According to a second aspect, a cell determining method is provided, including:

obtaining, by a network device, service capability information of a cell, where the service capability information includes slice information and/or service information; and sending, by the network device, the service capability information, where the service capability information is used by a terminal device to determine, based on the service capability information and a service requirement of the terminal device, a first cell in at least one cell as a cell to be camped on, where the first cell is a cell, in the at least one cell, that supports at least one service of the terminal device.

In one embodiment, the sending, by the network device, the service capability information includes:

sending, by the network device, the service capability information by using a broadcast message.

Therefore, according to the cell determining method in this embodiment of the present disclosure, the network device sends the service capability information of the cell to the terminal device, so that the terminal device determines, based on the service capability information and the service requirement of the terminal device, the first cell in the at least one cell as the cell to be camped on, where the first cell is the cell, in the at least one cell, that supports the at least one service of the terminal device, so that the terminal device can camp on a suitable cell.

According to a third aspect, a terminal device is provided, and is configured to perform the method in the first aspect or any possible implementation of the first aspect. Specifically, the apparatus includes a unit configured to perform the method in the first aspect or any possible implementation of the first aspect.

According to a fourth aspect, a network device is provided, and is configured to perform the method in the second aspect or any possible implementation of the second aspect.

Specifically, the apparatus includes a unit configured to perform the method in the second aspect or any possible implementation of the second aspect.

According to a fifth aspect, a terminal device is provided. The terminal device includes a processor, a memory, and a communications interface. The processor is connected to the memory and the communications interface. The memory is configured to store an instruction; the processor is configured to execute the instruction; and the communications interface is configured to communicate with another network element under control of the processor. When the processor executes the instruction stored in the memory, the execution enables the processor to perform the method in the first aspect or any possible implementation of the first aspect.

According to a sixth aspect, a network device is provided. The network device includes a processor, a memory, and a communications interface. The processor is connected to the memory and the communications interface. The memory is configured to store an instruction; the processor is configured to execute the instruction; and the communications interface is configured to communicate with another network element under control of the processor. When the processor executes the instruction stored in the memory, the execution enables the processor to perform the method in the second aspect or any possible implementation of the second aspect.

According to a seventh aspect, a computer-readable storage medium is provided, where the computer-readable storage medium stores a program, and the program enables a terminal device to perform the cell determining method according to the first aspect or any implementation of the first aspect.

According to an eighth aspect, a computer-readable storage medium is provided, where the computer-readable storage medium stores a program, and the program enables a network device to perform the cell determining method according to the second aspect or any implementation of the second aspect.

DESCRIPTION OF EMBODIMENTS

The following describes the technical solutions in the embodiments of the present disclosure with reference to the accompanying drawings in the embodiments of the present disclosure.

It should be understood that the technical solutions of the embodiments of the present disclosure may be applied to various communications systems, for example, current communications systems such as a Long Term Evolution (LTE) system, an LTE frequency division duplex (FDD) system, and an LTE time division duplex (TDD), or may be applied to a future 5G system.

It should be further understood that in the embodiments of the present disclosure, a network device may also be referred to as a network side device, a base station, or the like, and the base station may be an evolved NodeB (eNB or eNodeB) in LTE, or may be a base station device in a future 5G network, or the like. This is not limited in the present disclosure.

It should be further understood that in the embodiments of the present disclosure, a terminal device may communicate with one or more core networks through a radio access network (RAN). The terminal device may be referred to as an access terminal, user equipment (UE), a subscriber unit, a subscriber station, a mobile station, a mobile console, a remote station, a remote terminal, a mobile device, a user terminal, a terminal, a wireless communications device, a user agent, or a user apparatus. The terminal device may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, or a terminal device in a future 5G network.

Figure 1A:
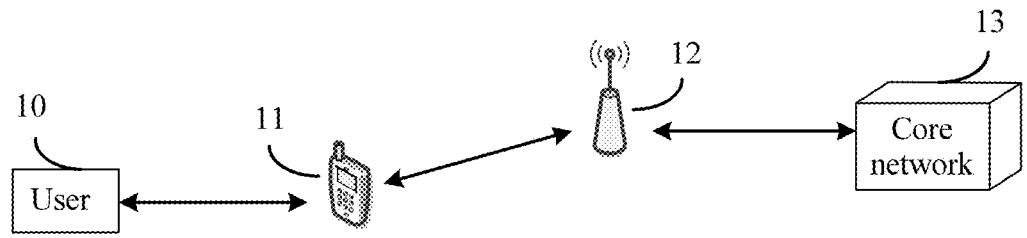
FIG. 1A is a schematic diagram of an application scenario according to an embodiment of the present disclosure.

FIG. 1A is a schematic diagram of an application scenario. It should be understood that, for ease of understanding, the scenario in FIG. 1A is introduced herein as an example for description, but does not constitute a limitation on the present disclosure. FIG. 1A shows a user 10, a terminal device 11, a base station 12, and a core network 13.

As shown in FIG. 1A, when the user 10 requires a service, the terminal device 11 may communicate with the core network 13 by using the base station 12. Herein, when communicating with the base station, the terminal device may read a system message delivered by the base station, and select, based on the system message, a cell for camping. The system message includes at least one of the following information: information about a public land mobile network (PLMN) or operator information, information about whether a cell is allowed to be camped on, and the like.

Figure 1B:
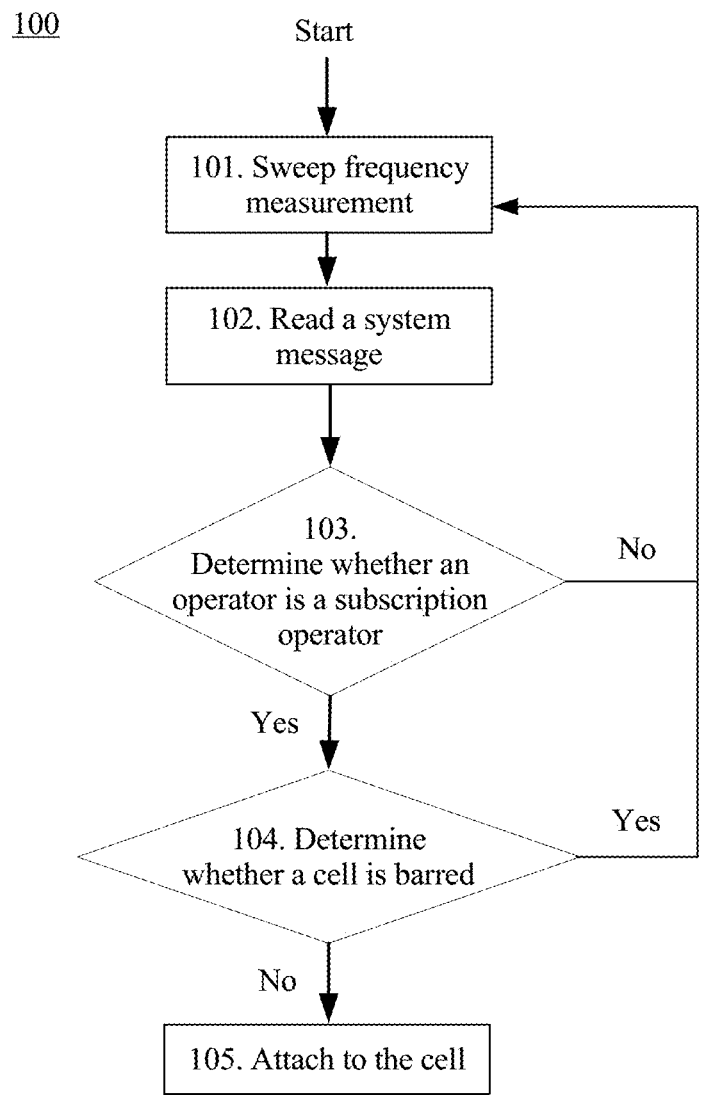
FIG. 1B is a schematic flowchart in which a terminal device selects a cell.

FIG. 1B is a flowchart of a process 100 in which a terminal device selects a cell. A cell selection process defined in the 3GPP protocol is shown in FIG. 1B, and the process 100 mainly includes the following operations:

Operation S101. The terminal device performs sweep frequency measurement.

Operation S102. The terminal device reads a system message sent by a base station.

Operation S103. The terminal device determines whether an operator is a subscription operator.

Operation S104. The terminal device determines whether a cell is barred.

Operation S105. The terminal device attaches to the cell.

Specifically, the terminal device performs sweep frequency measurement on all frequency channel numbers when the terminal device is powered on or is started (for example, when the terminal device is initially powered on or enters a service area from a non-serving area), and reads the system message delivered by the base station. The system message includes operator information. Then, the terminal device compares operator subscription information (for example, a PLMN ID) stored in a SIM card with operator subscription information in the system message, and determines whether the cell is a cell of the subscription operator. If it is determined that the operator is not the subscription operator, S101 to S103 are performed again. After determining that the cell is the cell of the subscription operator, the terminal device continues to determine whether the cell is barred. If the cell is not barred, the terminal device selects and attaches to the cell, and camps on the cell after a user identity is verified; or if the cell is barred, S101 to S104 are repeatedly performed.

However, in the prior art, when performing the foregoing cell selection process 100, the terminal device cannot identify whether the cell to which the terminal device attaches can support a service type required by the terminal device. If the cell cannot support a service required by the terminal device, the terminal device cannot obtain the required service. In other words, an existing procedure has a problem: The terminal device cannot camp on a suitable cell, and as a result, a requirement of a plurality of service types of the terminal device cannot be met. Therefore, in this application, service capability information of the cell is added to the system message, and the cell is identified based on the service capability information, so that the terminal device can camp on a suitable cell.

Figure 2:
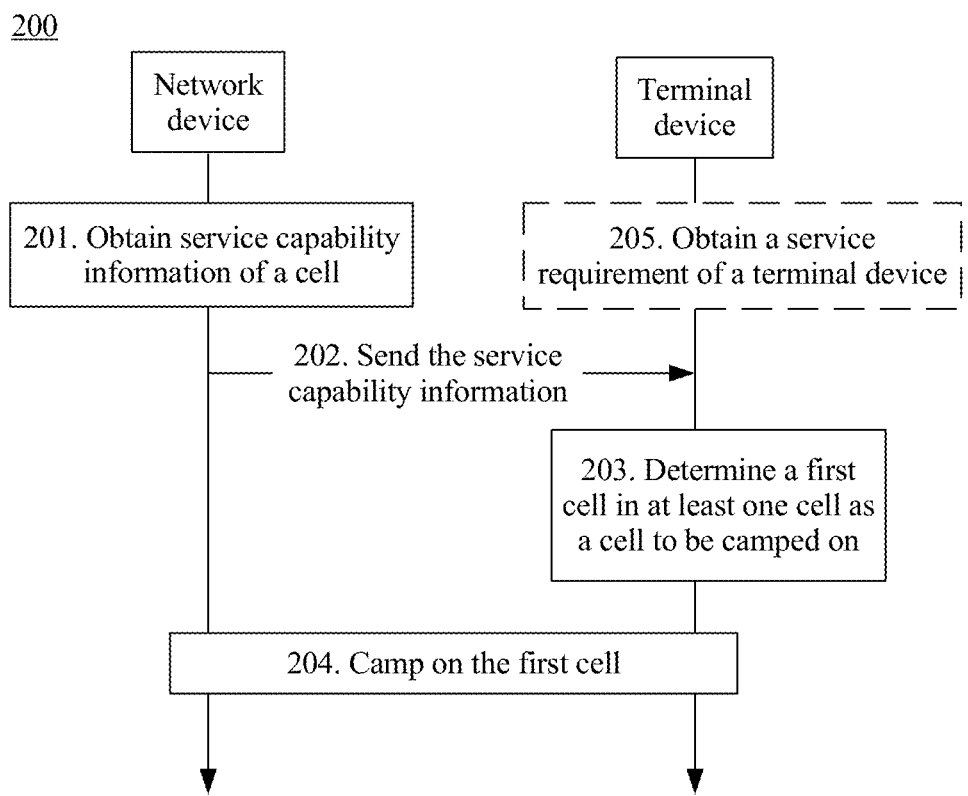
FIG. 2 is a schematic interaction diagram of a cell determining method according to an embodiment of the present disclosure.

FIG. 2 is a schematic interaction diagram of a cell determining method 200 according to an embodiment of the present disclosure. For example, a terminal device may be the terminal device 11 in FIG. 1, and a network device may be the base station 12 in FIG. 1. As shown in FIG. 2, the method 200 includes the following operations.

Operation S201. The network device obtains service capability information of a cell.

In one embodiment, the network device may add the service capability information of the cell to a system information block (SIB), where the service capability information may include slice information and/or service information, and the service capability information may be used to indicate a service that can be supported by the cell. For example, service capability information of a first cell may be added to the SIB, and the service capability information of the first cell is used to indicate a service that can be supported by the first cell.

Optionally, in this embodiment of the present disclosure, the service capability information may be described from a plurality of dimensions (for example, a vertical industry dimension or a service feature dimension). For example, the service capability information may include at least one of the following information.

a. Network Slice Information

In one embodiment, the network slice information may include a slice type (Slice type) and/or a slice identity. The network slice information may be described from a perspective of a service field, including an Internet of Vehicles field, a smart metering field, and the like.

The network slice may be referred to as a slice for short, and is an E2E network provided by an operator for a type of application with a specific QoS requirement. In other words, each service type is corresponding to a dedicated slice. Slices are isolated from each other and do not affect each other logically.

b. Service Information

In one embodiment, the service information may include a service type (Service type) and/or a service identity. The service information may be described from a perspective of a QoS dimension, including a broadband service, a short latency service, a big connection service, and a very important person (VIP) service, and the like.

c. Other Information that can Represent a Cell Capability, or Other Information that can Describe a Service Supported by a Cell In one embodiment, the foregoing service capability information (a to c) that is used to represent the cell capability may be used in combination. This is not limited herein.

Operation S202. The network device sends the service capability information of the cell.

In one embodiment, the network device may send the service capability information to the terminal device by using a broadcast message. In other words, service capability information of at least one cell may be carried in a system message delivered by the network device.

Correspondingly, that the terminal device obtains the service capability information of the at least one cell may include:

obtaining, by the terminal device, the service capability information of the at least one cell by using the broadcast message sent by the network device.

Operation S203. The terminal device determines, based on the service capability information and a service requirement of the terminal device, a first cell in at least one cell as a cell to be camped on.

In this embodiment of the present disclosure, the service requirement is used to indicate a service that may be required by the terminal device. The first cell is a cell, in the at least one cell, that supports at least one service of the terminal device. In one embodiment, the first cell can further meet a channel quality requirement.

Specifically, when selecting a cell, the terminal device may select, with reference to the service capability information and the service requirement, the first cell as the cell to be camped on. The following describes, by using an example, a process in which the terminal device selects the first cell as the cell to be camped on.

For example, in an initial cell selection scenario, after being powered on, the terminal device searches all cells (including an intra-frequency cell or an inter-frequency cell) of a frequency channel number, reads a system message, obtains the service capability information of the at least one cell based on the system message, and then determines, based on the service capability information and the service requirement of the terminal device, that the first cell may support the at least one service of the terminal device, so as to camp on the first cell.

For another example, in a scenario of selecting a cell with reference to historical information, the terminal device may directly search for a current corresponding cell based on historical storage information (including historical record information such as a frequency channel number of a cell that the terminal device last camps on and a cell parameter), obtain a system message, and obtain the service capability information of the at least one cell based on the system message. A subsequent operation is similar to that in the initial cell selection scenario, and details are not described herein again.

Herein, for the initial cell selection scenario, or for the scenario of selecting a cell with reference to historical information, a difference between this embodiment of the present disclosure and the prior art lies in that the service capability information is added to the system message, so that the terminal device may select, based on the service capability information, a cell for camping, so as to avoid camping on an unsuitable cell. In other words, a process in which the terminal device selects a cell is to search for a suitable cell with reference to the service capability information.

It should be understood that the "first cell" introduced herein is merely convenient for description, and is a cell in general, for example, the "cell to be camped on", but does not constitute a limitation on the present disclosure.

Operation S204. The terminal device camps on the first cell.

Specifically, after obtaining the service capability information of the at least one cell sent by the network device, the terminal device may determine, based on the service capability information and the service requirement of the terminal device, the first cell in the at least one cell as the cell to be camped on, where the first cell can support the at least one service of the terminal device, and finally camp on the first cell. In this way, the terminal device selects, by using the service capability information, a suitable cell for camping, so as to avoid a case in which the terminal device may camp on an unsuitable cell, and ensure that the terminal device obtains a required network service.

Optionally, in this embodiment of the present disclosure, a type of the service requirement of the terminal device may include one or more service types.

A mobile broadband (MBB) service: The service is characterized by a high throughput rate, and a high requirement on spectral efficiency of an air interface.

A machine type communication (MTC) service: The MTC service includes a short latency MTC service and a big connection MTC service, the short latency MTC service is characterized by a short latency requirement, high reliability, and insensitivity to spectral efficiency, and the big connection MTC service is characterized by a large quantity of terminals, a small-sized traffic, and a low sending frequency.

A VIP private network service: The VIP private network is a private network that serves a special group or a special department, the VIP private network service is characterized by high confidentiality, and a service feature of the VIP private network is similar to that of the MBB service.

Certainly, in addition to the foregoing plurality of enumerated service types, a vehicle to vehicle (V2V) service, a meter reading service, a voice service, a high-definition video service, and the like may be further included. This is not limited herein.

Therefore, according to the cell determining method in this embodiment of the present disclosure, the terminal device obtains the service capability information of the at least one cell, and determines, based on the service capability information and the service requirement of the terminal device, the first cell in the at least one cell as the cell to be camped on, where the first cell is the cell, in the at least one cell, that supports the at least one service of the terminal device, so that the terminal device can camp on a suitable cell.

In one embodiment, before the determining the first cell in the at least one cell as the cell to be camped on, the method 200 may further include:

obtaining, by the terminal device, a public land mobile network (PLMN) priority of the at least one cell, where the first cell has a highest PLMN priority in the at least one cell.

Specifically, during cell selection, the terminal device may preferentially consider a PLMN priority of a cell. If the first cell has the highest PLMN priority in all cells, the first cell is selected for camping. For example, the PLMN priority of the cell may include a high priority PLMN-high, a middle priority PLMN-middle, and a low priority PLMN-low. The terminal device may preferentially select a cell that has the high priority PLMN-high for camping.

Optionally, in an embodiment, the determining the first cell in the at least one cell as the cell to be camped on may include:

when the at least one cell has a same PLMN priority, selecting, by the terminal device, the first cell for camping, where the first cell has a highest slice matching degree in the at least one cell, and the slice matching degree represents a matching degree between a service capability supported by a cell and the service requirement of the terminal device. For example, the slice matching degree is used to represent a ratio of a quantity of services of the terminal device supported by the cell to a total quantity of services of the terminal device. For another example, the slice matching degree is used to represent a quantity of services of the terminal device supported by the cell.

In other words, for cells that have a same PLMN priority, the terminal device may select a cell that has a highest slice matching degree for camping.

For example, the following provides an example of a (PLMN, slice set) list.

Item 1: A cell is corresponding to the PLMN-high priority, and a slice matching degree is 100%.

Item 2: A cell is corresponding to the PLMN-high priority, and a slice matching degree is 80%.

Item 3: A cell is corresponding to the PLMN-middle priority, and a slice matching degree is 100%.

Item 4: A cell is corresponding to the PLMN-middle priority, and a slice matching degree is 60%.

Item 5: A cell is corresponding to the PLMN-low priority, and a slice matching degree is 70%.

Item 6: A cell is corresponding to the PLMN-low priority, and a slice matching degree is 40%.

In the foregoing example, an access stratum (AS) of the terminal device may preferentially select a cell that has a relatively high PLMN priority according to the (PLMN, slice set) list. For example, the terminal device selects the cell corresponding to the item 1. In one embodiment, when PLMN priorities are the same, the terminal device may select a cell that has a relatively high slice matching degree. For example, for the item 1 and the item 2 that have the same PLMN-high priority, the terminal device selects the cell that is corresponding to the item 1 and that has a relatively high slice matching degree for camping.

The foregoing describes an embodiment in which the terminal device preferentially considers the PLMN priority during cell selection, and the following describes an embodiment in which the terminal device preferentially considers the slice matching degree during cell selection.

Optionally, in an embodiment, before the determining the first cell in the at least one cell as the cell to be camped on, the method may further include:

obtaining, by the terminal device, a slice matching degree of the at least one cell, where the slice matching degree represents a matching degree between a service capability supported by a cell and the service requirement of the terminal device, and the first cell has a highest slice matching degree in the at least one cell.

Specifically, during cell selection, the terminal device may preferentially consider a slice matching degree of a cell. If the first cell has the highest slice matching degree in all cells, the first cell is selected for camping. For example, the slice matching degree is used to represent a ratio of a quantity of services of the terminal device supported by the cell to a total quantity of services of the terminal device. For another example, the slice matching degree is used to represent a quantity of services of the terminal device supported by the cell.

Optionally, in an embodiment, the determining the first cell in the at least one cell as the cell to be camped on may include:

when the at least one cell has a same slice matching degree, selecting, by the terminal device, the first cell for camping, where the first cell has a highest public land mobile network (PLMN) priority in the at least one cell.

In other words, for cells that have the same slice matching degree, the terminal device may select a cell that has a highest PLMN priority for camping.

For example, the following provides some examples of a (PLMN, slice set) list.

Item 1: A slice matching degree of a cell is 100%, and is corresponding to a PLMN-high priority.

Item 2: A slice matching degree of a cell is 100%, and is corresponding to a PLMN-middle priority.

Item 3: A slice matching degree of a cell is 60%, and is corresponding to a PLMN-high priority.

Item 4: A slice matching degree of a cell is 60%, and is corresponding to a PLMN-middle priority.

Item 5: A slice matching degree of a cell is 40%, and is corresponding to a PLMN-high priority.

Item 6: A slice matching degree of a cell is 40%, and is corresponding to a PLMN-middle priority.

In the foregoing example, an AS of the terminal device may preferentially select a cell that has a relatively high slice matching degree based on the (PLMN, slice set) list. For example, the terminal device selects the cell corresponding to the item 1. In one embodiment, when slice matching degrees are the same, the terminal device may select a cell that has a relatively high PLMN priority. For example, for the item 1 and the item 2 whose slice matching degrees are both 100%, the cell that is corresponding to the item 1 and that has a relatively high PLMN priority may be selected.

In one embodiment, the terminal device may further consider the PLMN priority of the cell and the slice matching degree of the cell in a compromise manner. For example, if there are some slices that need to be forcibly matched, the terminal device may select a cell in descending order of importance of "a forcibly-matched slice, a PLMN priority, and a matching degree of another slice".

In this embodiment of the present disclosure, when selecting a cell based on the PLMN priority and/or the slice matching degree, the terminal device may further determine whether the cell meets an S criterion (Selection Criterion) for cell selection. If the cell meets the S criterion, the cell is selected for camping. The following describes in detail the S criterion for cell selection.

A determining formula of the S criterion for cell selection is: $S_{rxlev} > 0$ and $S_{qual} > 0$, where $S_{rxlev} > 0$ is used to represent that absolute signal quality of the cell meets a preset threshold (that is, a cell selection RX level value), and $S_{qual} > 0$ is used to represent that relative signal quality (such as a signal-to-noise ratio) of the cell meets a preset threshold (that is, a cell selection quality value (dB)).

Specifically, $S_{rxlev} = Q_{rxlevmeas} - (Q_{rxlevmin} + Q_{rxlevminoffset}) - P_{compensation} - Q_{offset_{temp}}$, and $S_{qual} = Q_{qualmeas} - (Q_{qualmin} + Q_{qualminoffset}) - Q_{offset_{temp}}$.

$Q_{rxlevmeas}$ represents a receiving signal level value of a measured cell (namely, a measured cell RX level value), for example, a reference signal received power (RSRP) value.

$Q_{rxlevmin}$ represents a minimum receiving signal level value of a cell (namely, a minimum required RX level in the cell) broadcast in a system information block (SIB) 1.

$Q_{rxlevminoffset}$ represents a minimum receiving signal level offset value of the cell broadcast in the SIB 1. For example, the terminal device uses the offset value when attempting to select a cell that has a higher PLMN priority. Specifically, when the terminal device camps on a visited public land mobile network (VPLMN) to periodically reselect a cell, the terminal device reselects a cell based on the offset value corresponding to the cell that has the higher PLMN priority (in other words, $Q_{rxlevminoffset}$ represents "offset to the signalled $Q_{rxlevmin}$ taken into account in the Srxlev evaluation as a result of a periodic search for a higher priority PLMN while camped normally in a VPLMN").

$P_{compensation} = \max\{p_{max} - p_{MaximumOutputPower}, 0\}$, where $p_{max}$ represents a maximum transmit power value that is of the terminal device and that is allowed by the cell to be broadcast in the SIB 1, and is used in a process of transmitting a signal in uplink by a cell (in other words, maximum TX power level a UE may use when transmitting on the uplink in the cell (dBm) defined as $P_{EMAX}$ in [TS 36.101]). $Q_{offset_{temp}}$ represents a temporary offset value for a specific cell.

$p_{MaximumOutputPower}$ represents a maximum radio frequency output power capability of the terminal device (namely, maximum RF output power of the UE according to the UE power class as defined in [TS 36.101]); and $Q_{qualmeas}$ represents a receiving signal quality value of a measured cell (namely, a measured cell quality value), for example, a reference signal received quality (Reference Signal Received Quality, RSRQ) value.

$Q_{qualminoffset}$ represents a minimum receiving quality offset value of the cell broadcast in the SIB 1 (namely, a minimum required quality level in the cell). For example, the terminal device uses the offset value when attempting to select a cell that has a higher PLMN priority. Specifically, when the terminal device camps on a PLMN to periodically reselect a cell, the terminal device reselects a cell based on the offset value that is corresponding to the cell and that has the higher PLMN priority (in other words, offset to the signalled $Q_{qualmin}$ taken into account in the Squal evaluation as a result of a periodic search for a higher priority PLMN while camped normally in a VPLMN).

In this embodiment of the present disclosure, when selecting a cell or reselecting a cell, the terminal device may perform selection based on the service capability information of the cell. This is not limited herein. "Cell selection" of the terminal device is a process of selecting a cell to be camped on when the terminal device is in a non-camp state. "Cell reselection" of the terminal device is to select a new better cell when the terminal device is in a camp state. The foregoing describes a related embodiment in which the terminal device performs "cell selection", and the following describes a related embodiment in which the terminal device performs "cell reselection".

In one embodiment, the method 200 may further include:

obtaining, by the terminal device, a signal measurement value of the at least one cell; and reselecting, by the terminal device, a cell based on the signal measurement value of the at least one cell, the service capability information, and the service requirement of the terminal device.

Specifically, in a cell reselection scenario, the terminal device may first obtain the signal measurement value of the at least one cell, and then select a more suitable cell based on the at least one signal measurement value, the service capability information, and the service requirement of the terminal device.

In this embodiment of the present disclosure, the signal measurement value may include a signal receiving level value or a signal receiving quality value. A measurement signal targeted by the signal measurement value may be a pilot signal of the cell, or may be a synchronization signal of the cell (for example, a primary synchronization signal and/or a secondary synchronization signal), or another cell signal. This is not limited herein.

In one embodiment, the reselecting, by the terminal device, a cell based on the signal measurement value of the at least one cell, the service capability information, and the service requirement of the terminal device may include:

when a signal measurement value of each of the at least one cell is higher than a first threshold, and the first cell supports a maximum quantity of services of the terminal device, selecting, by the terminal device, the first cell as a reselected cell.

Specifically, when reselecting a cell, the terminal device may search all cells of a frequency channel number. When a signal measurement value of each of all the cells is higher than a threshold (for example, the first threshold), for example, when the cell signal measurement value is higher than an intra-frequency search threshold, or is higher than an inter-frequency search threshold, the terminal device may use the service capability information as a main factor for cell reselection. For example, when the signal measurement value of each of all the cells meets a preset condition, and the first cell supports a maximum quantity of services of the terminal device, the terminal device selects the first cell as the reselected cell.

It should be understood that the "first cell" introduced herein is merely convenient for description, and is a cell in general, for example, the "reselected cell", but does not constitute a limitation on the present disclosure.

It should be further understood that in this embodiment of the present disclosure, the "first threshold" may be a preset threshold. This is not limited herein. The "second threshold" described in the following is the same.

Therefore, in this embodiment of the present disclosure, when the terminal device reselects a cell, if the signal measurement value of each of all the cells is higher than a threshold, the terminal device may select, based on the service capability information, a cell that can support a maximum quantity of services of the terminal device as the reselected cell.

It should be understood that in this embodiment of the present disclosure, the first threshold may be a predefined intra-frequency search threshold value or inter-frequency search threshold. This is not limited herein.

In one embodiment, the reselecting, by the terminal device, a cell based on the signal measurement value of the at least one cell, the service capability information, and the service requirement of the terminal device may include:

when a quantity of services of the terminal device supported by each of the at least one cell is greater than a second threshold, and the first cell has a maximum signal measurement value in the at least one cell, selecting, by the terminal device, the first cell as the reselected cell.

Specifically, when reselecting a cell, the terminal device may search all cells of a frequency channel number. When a quantity of services supported by each of all the cells is higher than a threshold (for example, the second threshold), the terminal device may use the signal measurement value as a main factor for cell reselection. For example, when the first cell has a maximum signal measurement value in the at least one cell, the terminal device selects the first cell as the reselected cell.

Therefore, in this embodiment of the present disclosure, when the terminal device reselects a cell, if the quantity of services supported by each of all the cells is higher than a threshold, the terminal device may select, based on the signal measurement value, a cell that has a maximum signal measurement value as the reselected cell.

In the foregoing cell reselection process, the terminal device may comprehensively consider the signal measurement value of the cell and the service capability information of the cell, so as to obtain a more suitable cell.

It should be understood that, the foregoing is merely an example used for describing a case in which the terminal device focuses on the signal measurement value of the cell, or focuses on the service capability information of the cell. Certainly, in a specific implementation, the terminal device may alternatively consider the two factors in a compromise manner. For example, the terminal device may select a cell with an appropriate signal measurement value and an appropriate quantity of services supported by the cell as the reselected cell. This is not limited herein.

It should be further understood that in this embodiment of the present disclosure, the terminal device may preconfigure, by using a configuration parameter, whether to use the "signal measurement value" as a main determining factor for cell reselection or use the "service capability information" as a main determining factor for cell reselection.

Optionally, in this embodiment of the present disclosure, when reselecting a cell, the terminal device may also perform reselection according to the cell selection solution (for example, PLMN selection or slice selection) described above. For brevity, details are not described herein again.

In addition, in the cell reselection process, further, in addition to determining whether the cell meets the S criterion described above, a more suitable cell may be selected according to an R criterion (Re-selection Criterion). Specific operations are included.

Operation 1: Determine whether the cell meets the S criterion, so that the terminal device further determines whether the cell that meets the S criterion meets the R criterion. Herein, a definition and a determining manner of the S criterion are similar to those described above, and details are not described herein again.

Operation 2: Compare signal quality of a source cell with signal quality of a target cell according to the R criterion, so as to determine a cell that has better signal quality.

Specifically, the R criterion may be represented by using the following formulas:

$$R_s = Q_{meas,s} + Q_{Hyst} - Q_{offset_{temp}}$$

$$R_n = Q_{meas,n} - Q_{offset} - Q_{offset_{temp}}.$$

$R_s$ represents signal quality of a serving cell (namely, the source cell), and $R_n$ represents signal quality of a neighbor cell (namely, the target cell).

$Q_{meas,s}$ represents a signal-to-noise ratio of the source cell participating in the comparison (namely, RSRP measurement quantity used in cell reselections), and $Q_{Hyst}$ represents a hysteresis parameter that avoids a ping-pong effect.

$Q_{meas,n}$ represents a signal-to-noise ratio of the target cell participating in the comparison (namely, RSRP measurement quantity used in cell reselections).

$Q_{offset}$ represents an offset value configured by an operator, and is used to indicate a cell on which the terminal device preferentially camps.

$Q_{offset_{temp}}$ represents a temporary offset value for a specific cell (namely, offset temporarily applied to a cell as specified in [3]).

In one embodiment, a non-access stratum (NAS) of the terminal device may periodically perform PLMN selection or slice selection, to provide a (PLMN, slice set) list, so that the access stratum AS of the terminal device selects a cell or reselects a cell according to the (PLMN, slice set) list.

In one embodiment, the method 200 may further include:

when the first cell does not support all services of the terminal device, reselecting, by the terminal device, a cell according to a preset moment, and selecting a second cell as a reselected cell, where a quantity of services of the terminal device supported by the second cell is greater than a quantity of services of the terminal device supported by the first cell.

Specifically, if it is determined that the first cell cannot support all the services of the terminal device, the terminal device may reselect a cell based on the predefined moment. For example, the terminal device may start a timer, and trigger the cell reselection process during running of the timer. If the terminal device scans that the quantity of services of the terminal device supported by the second cell is greater than the quantity of services of the terminal device supported by the first cell, the terminal device selects the second cell as the reselected cell.

For example, if the terminal device scans that the second cell supports all the services of the terminal device, the terminal device stops scanning, and selects the second cell as the reselected cell. In one embodiment, the second cell can further meet a channel quality requirement.

It should be understood that the "second cell" introduced herein is merely convenient for description, but does not constitute a limitation on the present disclosure.

In one embodiment, before S203, the method 200 may further include:

Operation S205. The terminal device obtains the service requirement of the terminal device.

In one embodiment, in a specific implementation, the terminal device may provide an interface, so that a user sets a service requirement that needs to be supported by the terminal device. For example, the service requirement includes a service type supported by the terminal device and/or a service priority. The service requirement includes the at least one service that may be required by the terminal device.

In one embodiment, the terminal device may obtain the service requirement in at least one of the following manners.

a. A Factory Defaults Manner

For example, the service requirement of the terminal device may be directly solidified in the terminal device by a provider of the terminal device.

b. An Operator Setting Manner

For example, the service requirement of the terminal device may be written, by a mobile operator, into a subscriber identity module (SIM) card, or may be recorded in SIM subscription information or other information.

c. A User Software Setting Manner

For example, the service requirement of the terminal device may be set in application software of an intelligent terminal. For example, in an Internet of Vehicles app, a user may set the service requirement by using a setting interface of the Internet of Vehicles app.

It should be understood that the foregoing enumerated manners (a to c) of obtaining the service requirement may be used in combination. This is not limited herein.

Figure 3:
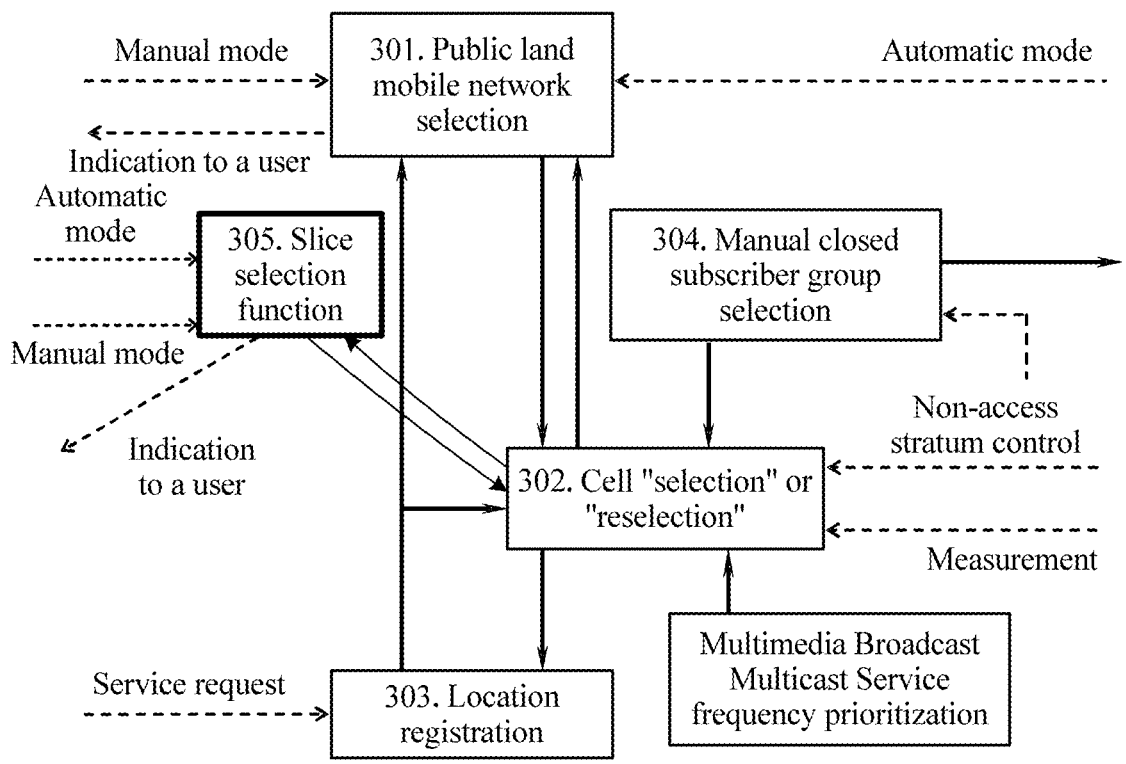
FIG. 3 is a schematic flowchart of an example in which a terminal device selects a cell according to an embodiment of the present disclosure.
Figure 4:
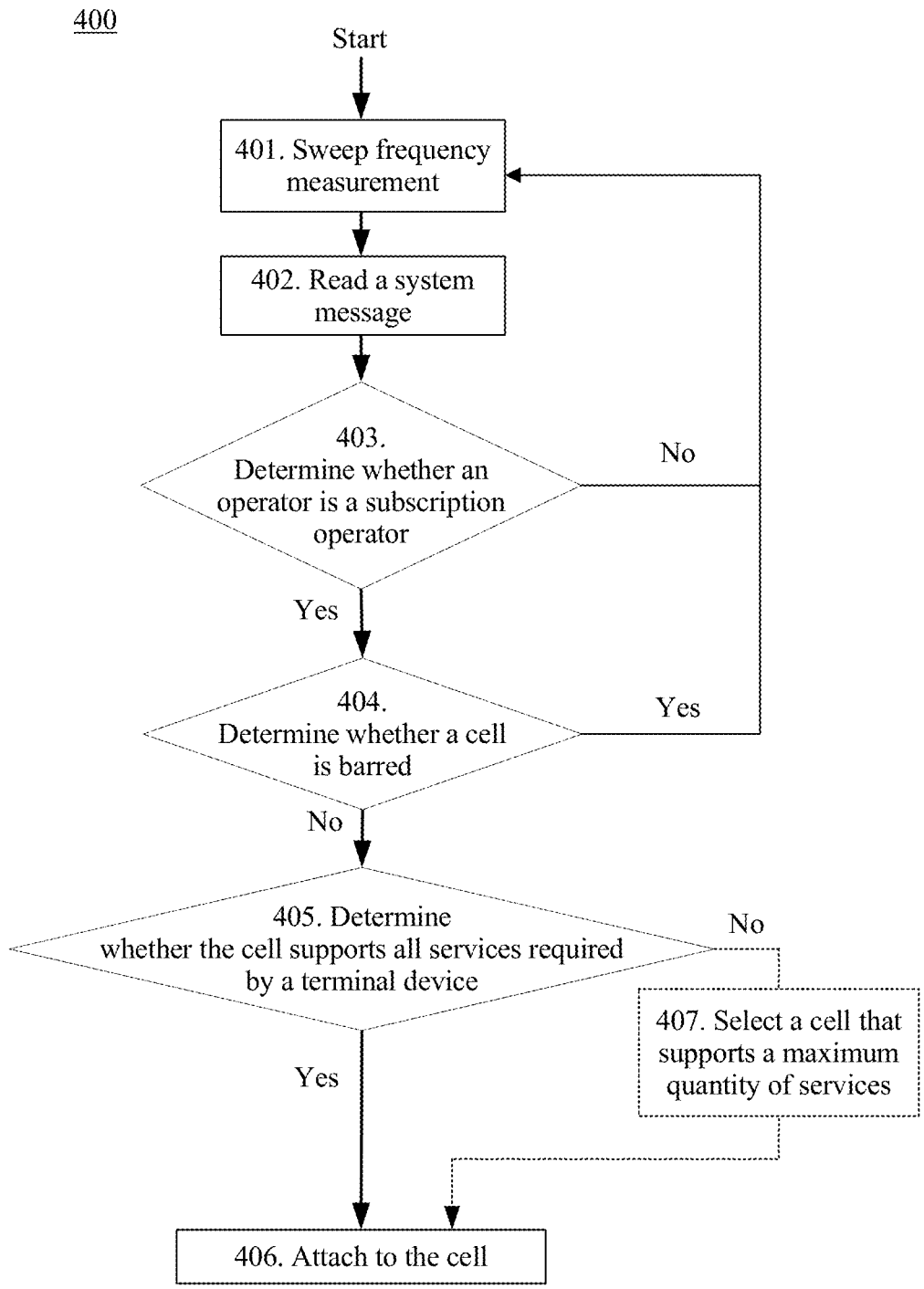
FIG. 4 is a schematic flowchart in which a terminal device selects a cell according to an embodiment of the present disclosure.

To make a person skilled in the art understand the cell determining method in this embodiment of the present disclosure, the following describes this embodiment of the present disclosure with reference to FIG. 3 and FIG. 4.

FIG. 3 is a schematic diagram of an example in which a terminal device selects a cell according to an embodiment of the present disclosure. It should be understood that the example herein is used to facilitate a person skilled in the art to understand the embodiments of the present disclosure, but does not constitute a limitation on the present disclosure. It should be further understood that, in FIG. 3, some procedures similar to those in the standard are simplified, and for a specific procedure, a protocol in the standard prevails. This is not limited herein.

As shown in FIG. 3, the terminal device in an idle mode may perform four processes.

301. Public land mobile network selection (PLMN Selection).

302. Cell "selection" and "reselection".

303 Location registration.

304. Manual closed subscriber group (CSG) selection (Support for manual CSG Selection).

Processes of 301 to 304 and Multimedia Broadcast Multicast Service (MBMS) frequency prioritization in the figure are similar to those in the 3GPP standard protocol. For brevity, details are not described herein. Compared with an existing standard protocol, this embodiment of the present disclosure further includes operation 305: A slice selection function. Some examples related to the "slice selection function" are described below. Certainly, the examples are not limited to only the following scenario. More appropriate implementations may be included in a specific implementation.

Specifically, in 305, the terminal device supports an automatic selection mode (Automatic Mode) and a manual selection mode (Manual Mode).

For the automatic selection mode in 305, cell selection of the terminal device includes an "initial selection" scenario and a "historical information selection" scenario. In the "initial selection" scenario, after being powered on, the terminal device performs searching on all frequency channel numbers, so as to search for a cell with a highest signal on the frequency channel numbers; obtains service capability information (namely, slice information) of the cell by reading a system message; and reports the service capability information to the "slice selection function". In the "historical information selection scenario", the terminal device directly searches for, based on historical information (including a frequency channel number and a cell parameter of a cell that is last camped on), the cell that is last camped on; obtains corresponding service capability information by reading a system message; and reports the service capability information to the "slice selection function". In the two scenarios, a non-access stratum NAS of the terminal device may select a PLMN and a slice by using information such as the service capability information (such as an available slice) reported by an access stratum AS and an available PLMN. The NAS delivers a selected PLMN and slice to the AS, so that the AS selects a corresponding cell for camping. Herein, if priorities of a plurality of PLMNs are the same, a PLMN that has a relatively high slice matching degree is selected. PLMN selection is the same as protocol definition, and details are not described herein.

In addition, for the automatic selection mode in 305, the terminal device may reselect a cell with reference to the service capability information. "Cell reselection" is to find a more suitable cell. If a signal measurement value of a current serving cell is lower than a threshold (for example, an intra-frequency search threshold or an inter-frequency search threshold), measurement (for example, intra-frequency or inter-frequency reselection measurement) is started to reselect a cell. For a plurality of measured cells, the terminal device may obtain related information of each cell by reading the system message, where the related information includes information such as signal quality, PLMN information, and service capability information (such as an available slice) of the cell, and then report the information to the NAS. A measurement process during cell reselection is similar to the process during initial cell selection, and details are not described herein. The NAS of the terminal device performs PLMN reselection and slice reselection based on the information reported at the AS.

Herein, for the "cell reselection" scenario, the terminal device may reselect a cell with reference to the signal measurement value and the slice matching degree. Specifically, there are two possible policies: (1) If a signal measurement value of each of the plurality of cells is higher than a threshold, the terminal device selects a cell that has a highest slice matching degree. (2) If a slice matching degree of each of the plurality of cells exceeds a threshold, the terminal device selects a cell with best signal quality. It should be understood that a specific policy selected by the terminal device may be configured by using a configuration parameter.

In one embodiment, for example, if a slice matching degree of a cell does not reach a preset threshold (for example, 100%), the terminal device may trigger a timer to reselect a cell. In this case, the foregoing policy (1) may be used. For another example, if a signal measurement value of a cell is less than a threshold, the foregoing policy (2) may be used in this case.

For the manual selection mode in 305, a mobile phone user may initiate manual selection on a screen, and then trigger the NAS to initiate cell selection (for example, a cell including one or more slices is selected) or cell reselection (for example, a cell that has a relatively high slice matching degree is found). A subsequent process is similar to that in the automatic selection mode, and details are not described herein. In addition, in the manual selection mode, the terminal device may stop searching in the following manners: (1) The mobile phone user manually stops selection. (2) Selection stops after timeout. For example, after a response time expires or after a searching timer times out, a search stops even if a slice matching degree does not reach 100%. (3) If a slice matching degree reaches 100%, a search may stop.

It should be understood that sequence numbers of the foregoing processes do not mean execution sequences in the embodiments of the present disclosure. The execution sequences of the processes should be determined according to functions and internal logic of the processes, and should not be construed as any limitation on the implementation processes of the embodiments of the present disclosure.

In conclusion, according to the cell determining method in this embodiment of the present disclosure, the slice selection function is added to the standard protocol, so that the terminal device can select a cell or reselect a cell with reference to the service capability information (the slice information) during initial cell selection or cell reselection, so as to camp on a suitable cell or more suitable cell.

FIG. 4 is a schematic flowchart of a process 400 in which a terminal device selects a cell according to an embodiment of the present disclosure. It should be understood that the process 400 herein is merely used to facilitate a person skilled in the art to understand the embodiments of the present disclosure, but does not constitute a limitation on the present disclosure. As shown in FIG. 4, the process 400 includes the following operations.

Operation S401. The terminal device performs sweep frequency measurement.

Specifically, after being started, the terminal device performs sweep frequency measurement on all frequency channel numbers, so as to facilitate to subsequently select a cell for camping.

Operation S402. The terminal device reads a system message sent by a base station.

Specifically, after sweep frequency measurement, the terminal device may read the system message of the cell, and the system message is sent by the base station through broadcasting. Different from the process 100, service capability information of the cell is added to the system message, where the service capability information is used to indicate at least one service supported by the cell, and the service capability information includes slice information and/or service information.

Operation S403. The terminal device determines whether an operator is a subscription operator.

Operation S404. The terminal device determines whether a cell is barred.

Herein, S403 and S404 may be performed based on a determining process in FIG. 1B. For brevity, details are not described herein again.

Operation S405. The terminal device determines whether the cell supports all services required by the terminal device.

Specifically, compared with the prior art, the terminal device in this embodiment of the present disclosure may determine, based on the service capability information in the system message, whether the cell may support all the services required by the terminal device, that is, select a cell for camping with reference to the service capability information of the cell.

Operation S406. The terminal device attaches to the cell.

Specifically, when determining, based on the service capability information of the cell, that the cell may support all the services required by the terminal device, the terminal device camps on or attaches to the cell.

In one embodiment, in a case, in operation S407, if the cell does not support all the services required by the terminal device, a cell that supports a maximum quantity of services is selected.

For example, this case may be applied to a "cell reselection" process of the terminal device. In other words, if the terminal device determines that the cell cannot cover all the services of the terminal device, the terminal device selects, in a plurality of cells, the cell that can support a maximum quantity of services for camping. In this way, it is ensured that the terminal device can camp on an optimal cell.

In conclusion, according to the cell determining method in this embodiment of the present disclosure, the terminal device can select a cell or reselect a cell based on newly added service capability information, so as to camp on a suitable cell.

The foregoing describes the cell determining method according to this embodiment of the present disclosure. The following describes the terminal device and the network device according to this embodiment of the present disclosure.

Figure 5:
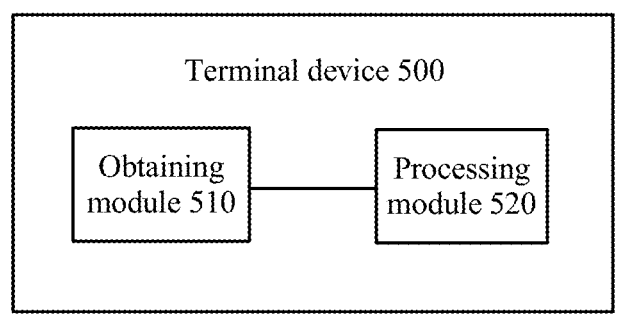
FIG. 5 is a schematic block diagram of a terminal device according to an embodiment of the present disclosure.

FIG. 5 shows a terminal device 500 according to an embodiment of the present disclosure. As shown in FIG. 5, the terminal device 500 includes:

an obtaining module 510, configured to obtain service capability information of at least one cell, where the service capability information includes slice information and/or service information; and a processing module 520, configured to determine, based on the service capability information obtained by the obtaining module 510 and a service requirement of the terminal device, a first cell in the at least one cell as a cell to be camped on, where the first cell is a cell, in the at least one cell, that supports at least one service of the terminal device.

The terminal device 500 in this embodiment of the present disclosure obtains the service capability information of the at least one cell, and determines, based on the service capability information and the service requirement of the terminal device, the first cell in the at least one cell as the cell to be camped on, where the first cell is the cell, in the at least one cell, that supports the at least one service of the terminal device, so that the terminal device can camp on a suitable cell.

Optionally, in an embodiment, the obtaining module 520 is further configured to:

obtain a public land mobile network (PLMN) priority of the at least one cell, where the first cell has a highest PLMN priority in the at least one cell.

Optionally, in an embodiment, the processing module 520 is specifically configured to:

when the at least one cell has a same PLMN priority, select the first cell for camping, where the first cell has a highest slice matching degree in the at least one cell, and the slice matching degree represents a matching degree between a service capability supported by a cell and the service requirement of the terminal device.

Optionally, in an embodiment, the obtaining module 520 is further configured to:

obtain a slice matching degree of the at least one cell, where the slice matching degree represents a matching degree between a service capability supported by a cell and the service requirement of the terminal device, and the first cell has a highest slice matching degree in the at least one cell.

Optionally, in an embodiment, the processing module 520 is specifically configured to:

when the at least one cell has a same slice matching degree, select the first cell for camping, where the first cell has a highest public land mobile network (PLMN) priority in the at least one cell.

Optionally, in an embodiment, the obtaining module 520 is further configured to:

obtain a signal measurement value of the at least one cell.

The processing module 520 is further configured to reselect a cell based on the signal measurement value of the at least one cell obtained by the obtaining module 510, the service capability information, and the service requirement of the terminal device.

Optionally, in an embodiment, the processing module 520 is specifically configured to:

when a signal measurement value of each of the at least one cell is higher than a first threshold, and the first cell supports a maximum quantity of services of the terminal device, select the first cell as a reselected cell.

Optionally, in an embodiment, the processing module 520 is specifically configured to:

when a quantity of services of the terminal device supported by each of the at least one cell is greater than a second threshold, and the first cell has a maximum signal measurement value in the at least one cell, select the first cell as a reselected cell.

Therefore, the terminal device 500 in this embodiment of the present disclosure obtains the service capability information of the at least one cell, and determines, based on the service capability information and the service requirement of the terminal device, the first cell in the at least one cell as the cell to be camped on, where the first cell is the cell, in the at least one cell, that supports the at least one service of the terminal device, so that the terminal device can camp on a suitable cell. Further, the cell may be reselected based on the service capability information and the signal measurement value of the cell, so as to obtain a better cell.

Optionally, in an embodiment, the processing module 520 is further configured to:

when the first cell does not support all services of the terminal device, reselect a cell according to a preset moment, and select a second cell as a reselected cell, where a quantity of services of the terminal device supported by the second cell is greater than a quantity of services of the terminal device supported by the first cell.

Herein, the terminal device may trigger a timer to reselect a cell.

In one embodiment, the obtaining module 510 is specifically configured to:

receive the service capability information sent by a network device by using a broadcast message.

The terminal device 500 in this embodiment of the present disclosure may be corresponding to an execution body of a terminal device side method according to this embodiment of the present disclosure, and the foregoing and other operations and/or functions of modules in the terminal device 500 are respectively used to implement corresponding procedures of the foregoing methods on a terminal device side. For brevity, details are not described herein.

Therefore, the terminal device 500 in this embodiment of the present disclosure obtains the service capability information of the at least one cell, and determines, based on the service capability information and the service requirement of the terminal device, the first cell in the at least one cell as the cell to be camped on, where the first cell is the cell, in the at least one cell, that supports the at least one service of the terminal device, so that the terminal device can camp on a suitable cell.

Figure 6:
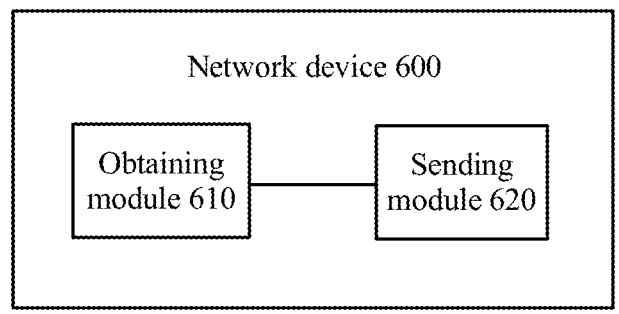
FIG. 6 is a schematic block diagram of a network device according to an embodiment of the present disclosure.

FIG. 6 shows a network device 600 according to an embodiment of the present disclosure. As shown in FIG. 6, the network device 600 includes:

an obtaining module 610, configured to obtain service capability information of at least one cell, where the service capability information includes slice information and/or service information; and a sending module 620, configured to send the service capability information obtained by the obtaining module 610, where the service capability information is used by a terminal device to determine, based on the service capability information and a service requirement of the terminal device, a first cell in the at least one cell as a cell to be camped on, where the first cell is a cell, in the at least one cell, that supports at least one service of the terminal device.

In one embodiment, the sending module 620 is specifically configured to:

send the service capability information by using a broadcast message.

The network device 600 in this embodiment of the present disclosure may be corresponding to an execution body of a network device side method according to this embodiment of the present disclosure, and the foregoing and other operations and/or functions of modules in the network device 600 are respectively used to implement corresponding procedures of the foregoing methods on a network device side. For brevity, details are not described herein.

Therefore, the network device 600 in this embodiment of the present disclosure sends the obtained service capability information of the at least one cell to the terminal device, so that the terminal device determines, based on the service capability information and the service requirement of the terminal device, the first cell in the at least one cell as the cell to be camped on, where the first cell is the cell, in the at least one cell, that supports the at least one service of the terminal device, so that the terminal device can camp on a suitable cell.

Figure 7:
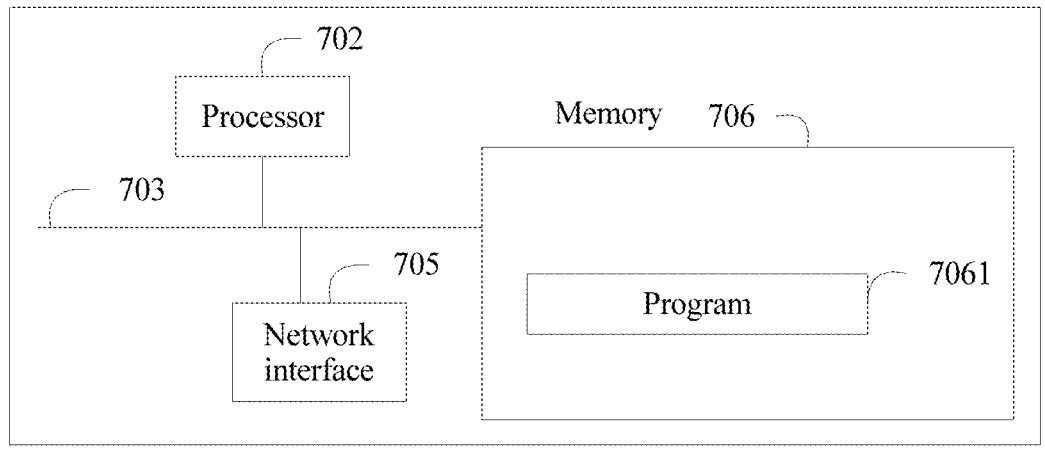
FIG. 7 is a structural diagram of a terminal device according to another embodiment of the present disclosure.

FIG. 7 shows an apparatus structure of a terminal device according to another embodiment of the present disclosure. The terminal device includes at least one processor 702 (for example, a CPU), at least one network interface 705 or another communications interface, a memory 706, and at least one communications bus 703 that is configured to implement connection and communication between these apparatuses. The processor 702 is configured to execute an executable module stored in the memory 706, such as a computer program. The memory 706 may include a high-speed random access memory (RAM), or may include a non-volatile memory, for example, at least one disk memory. A communication connection to at least one other network element is implemented by using the at least one network interface 705 (which may be wired or wireless).

In some implementations, the memory 706 stores a program 7061, and the processor 702 executes the program 7061 to perform the cell determining method on a terminal device side according to the foregoing embodiment of the present disclosure. For brevity, details are not described herein.

Figure 8:
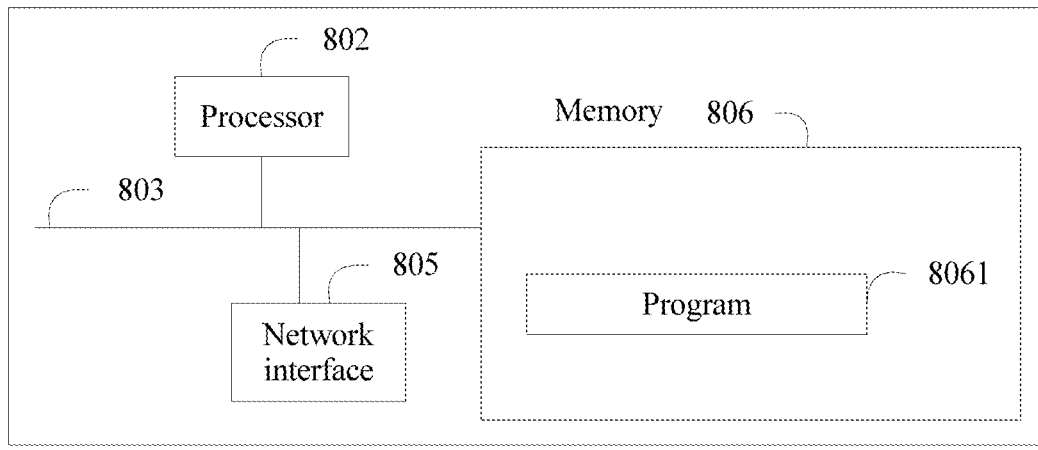
FIG. 8 is a structural diagram of a network device according to another embodiment of the present disclosure.

FIG. 8 shows an apparatus structure of a network side device according to another embodiment of the present disclosure. The network side device includes at least one processor 802 (for example, a CPU), at least one network interface 805 or another communications interface, a memory 806, and at least one communications bus 803 that is configured to implement connection and communication between these apparatuses. The processor 802 is configured to execute an executable module stored in the memory 806, such as a computer program. The memory 806 may include a high-speed random access memory (RAM), or may include a non-volatile memory, for example, at least one disk memory. A communication connection to at least one other network element is implemented by using the at least one network interface 805 (which may be wired or wireless).

In some implementations, the memory 806 stores a program 8061, and the processor 802 executes the program 8061 to perform the cell determining method on a network device side according to the foregoing embodiment of the present disclosure. For brevity, details are not described herein.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in the embodiments of the present disclosure. The execution sequences of the processes should be determined according to functions and internal logic of the processes, and should not be construed as any limitation on the implementation processes of the embodiments of the present disclosure.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A cell determining method, comprising:
   obtaining, by a terminal device, service capability information of at least one cell, wherein the service capability information comprises Quality of Service (QoS) information, and comprises slice information and/or service information;
   obtaining, by the terminal device, a public land mobile network (PLMN) priority of the at least one cell; and
   determining, by the terminal device based on the service capability information and a service requirement of the terminal device, a first cell in the at least one cell as a cell to be camped on, wherein the first cell is a cell, in the at least one cell, that supports at least one service of the terminal device, wherein the first cell has a highest PLMN priority in the at least one cell, wherein when the at least one cell has a same PLMN priority, the first cell has a highest slice matching degree in the at least one cell, the slice matching degree representing a matching degree between a service capability supported by a cell and the service requirement of the terminal device and being based on a quantity of services of terminal device supported by the cell.

2. The method according to claim 1, wherein before the determining a first cell in the at least one cell as a cell to be camped on, the method further comprises:
   obtaining, by the terminal device, a slice matching degree of the at least one cell, wherein the slice matching degree represents a matching degree between a service capability supported by a cell and the service requirement of the terminal device, and the first cell has a highest slice matching degree in the at least one cell.

3. The method according to claim 2, wherein the determining a first cell in the at least one cell as a cell to be camped on comprises:
   when the at least one cell has a same slice matching degree, selecting, by the terminal device, the first cell for camping, wherein the first cell has a highest public land mobile network (PLMN) priority in the at least one cell.

4. The method according to claim 1, wherein the method further comprises:
   when the first cell does not support all services of the terminal device, reselecting, by the terminal device, a cell according to a preset moment, and selecting a second cell as a reselected cell, wherein a quantity of services of the terminal device supported by the second cell is greater than a quantity of services of the terminal device supported by the first cell.

5. The method according to claim 1, wherein the obtaining, by a terminal device, service capability information of at least one cell comprises:
   receiving, by the terminal device, the service capability information sent by a network device by using a broadcast message.

6. A cell determining method, comprising:
   obtaining, by a network device, service capability information of a cell, wherein the service capability information comprises Quality of Service (QoS) information, and comprises slice information and/or service information; and
   sending, by the network device, the service capability information, wherein the service capability information is used by a terminal device to determine, based on the service capability information and a service requirement of the terminal device, a first cell in at least one cell as a cell to be camped on, wherein the first cell is a cell, in the at least one cell, that supports at least one service of the terminal device, wherein the first cell has a highest public land mobile network (PLMN) priority in the at least one cell, wherein when the at least one cell has a same PLMN priority, the first cell has a highest slice matching degree in the at least one cell, the slice matching degree representing a matching degree between a service capability supported by a cell and the service requirement of the terminal device and being based on a quantity of services of terminal device supported by the cell.

7. The method according to claim 6, wherein the sending, by the network device, the service capability information comprises:
   sending, by the network device, the service capability information by using a broadcast message.

8. A terminal device in a wireless communication system, comprising:
   a processor; and
   a memory unit coupled to the processor for storing program instructions,
   wherein the program instructions, when executed by the processor, cause the terminal device to:
      obtain service capability information of at least one cell, wherein the service capability information comprises Quality of Service (QoS) information, and comprises slice information and/or service information;
      obtain a public land mobile network (PLMN) priority of the at least one cell, and
      determine based on the service capability information and a service requirement of the terminal device, a first cell in the at least one cell as a cell to be camped on, wherein the first cell is a cell, in the at least one cell, that supports at least one service of the terminal device, wherein the first cell has a highest PLMN priority in the at least one cell, wherein when the at least one cell has a same PLMN priority, the first cell has a highest slice matching degree in the at least one cell, the slice matching degree representing a matching degree between a service capability supported by a cell and the service requirement of the terminal device and being based on a quantity of services of terminal device supported by the cell.

9. The terminal device according to claim 8, wherein the program instructions further cause the terminal device to:
   obtain a slice matching degree of the at least one cell, wherein the slice matching degree represents a matching degree between a service capability supported by a cell and the service requirement of the terminal device, and the first cell has a highest slice matching degree in the at least one cell.

10. The terminal device according to claim 8, wherein the program instructions further cause the terminal device to:
    when the at least one cell has a same slice matching degree, select the first cell for camping, wherein the first cell has a highest public land mobile network (PLMN) priority in the at least one cell.

11. The terminal device according to claim 8, wherein the program instructions further cause the terminal device to:
    when the first cell does not support all services of the terminal device, reselect a cell according to a preset moment, and selecting a second cell as a reselected cell, wherein a quantity of services of the terminal device supported by the second cell is greater than a quantity of services of the terminal device supported by the first cell.

12. The terminal device according to claim 8, wherein the program instructions further cause the terminal device to:
receive the service capability information from a network device by using a broadcast message.

* * * * *